United States Patent [19]
Yajima

[11] Patent Number: 5,259,300
[45] Date of Patent: Nov. 9, 1993

[54] STIRRER FOR FOOD AND COOKING METHOD

[75] Inventor: Kenji Yajima, Tokyo, Japan
[73] Assignee: Sango Co., Ltd., Tokyo, Japan
[21] Appl. No.: 944,827
[22] Filed: Sep. 14, 1992
[30] Foreign Application Priority Data

Jan. 10, 1992 [JP] Japan ................................ 4-002742

[51] Int. Cl.$^5$ ............................................. A47J 27/00
[52] U.S. Cl. ........................................ 99/348; 366/57; 366/225
[58] Field of Search ....................... 99/348; 366/23–25, 366/45, 46, 47, 48, 56, 57, 58, 228, 229, 225, 144

[56] References Cited

FOREIGN PATENT DOCUMENTS 62-7381 2/1987 Japan .

Primary Examiner—Robert W. Jenkins
Attorney, Agent, or Firm—Colucci & Umans

[57] ABSTRACT

A stirrer in the form of a stripe is installed on an inner wall of a cylindrical pot of food stirring apparatus, a width of a scrape-up surface is formed to be narrower from an opening side of the cylindrical pot toward a bottom thereof, and a projection is provided on an outer edge side of the scrape-up surface.

In the food stirring and cooking apparatus which rotatably supports the cylindrical pot in which a stirrer is provided on the inner wall thereof, not only rotational operation along the edge of the cylindrical pot but also longitudinal rotational operation from the opening side of the pot to the bottom and from the bottom to the opening side are applied to food so that the food is turned and stirred whereby increasing the food stirring effect.

When the cylindrical pot is rotated, the food put into the cylindrical pot moves in the direction reversed to the rotational direction of the pot due to its own weight and is scraped up by the stirrer. At this time, since the projection is provided on the outer edge side of the scrape-up surface of the stirrer, the food is supported by the projection, without immediately falling the inner wall surface of the pot, and moves down toward the bottom of the pot The food not only rotates along the edge of the cylindrical pot but also rotates in the longitudinal direction from the opening side to the bottom of the pot.

7 Claims, 3 Drawing Sheets

STIRRER FOR FOOD AND COOKING METHOD

BACKGROUND OF THE INVENTION

1. Field of the Invention

The present invention relates to a stirrer and a cooking method used for a simple stirring cooking such as a vinegared rice, a dressed dish and the like, and for a continuous stirring and cooking food such as a so-called non-oil saute in which an anion, vegetables and the like are heated and fried without using oil.

2. Prior Art

Conventionally, stirring and cooking apparatuses in which a cylindrical pot having a bottom portion moved down from a horizontal state and provided with a stirrer on an inner wall thereof is rotatably and obliquely supported have been proposed in Japanese Utility Model Specification (Japanese Utility Model Publication No. 62(1987)-7381) proposed by the present applicant and other publications. However, only a few proposals have devised a shape of a stirrer in particular. The rotation and sliding of food to be cooked within the cylidrical pot has been limited to cicular rotation along the edge of the inner wall thereof.

Accordingly, if the rotation and sliding of food to be cooked within the cylindrical pot is limited to the circular rotation along the edge of the inner wall of the pot as in prior art, a scorch resulting from the sliding of food to be cooked can be avoided but mixing of food to be cooked is extremely incomplete, failing to sufficiently perform the function as stirring and cooking means.

Further, in a conventional frying method using oil, an oil film protects food to be cooked, which is therefore extremely effective. However, in the case of non-oii saute using no oil to prevent dissipation of components contained in food to be cooked or to fry and cook food not to take oil, rapid stirring and adequate supply of water are essential. Therefore, the conventional stirring and cooking method cannot expect a sufficient effect.

Moreover, the conventional frying method has a drawback such that since sufficient heating cannot be made in a short time, unnecessary water vapor is urged to be generated, and the thus generated water vapor is discharged, because of which a vicious circle is repeated in which when a quantity of air passing through a blower is increased, a temperature within the pot body is further lowered.

SUMMARY OF THE INVENTION

The present invention has succeeded in that a basic modification is applied to the shape of a stirrer provided on the inner wall of a cylindrical pot so that the width of a scrape-up surface becomes narrower from an opening side of the pot toward a bottom, and a projection is provided on the outer edge of the surface so that the rotational operation in a longitudinal direction from the opening side to the bottom of the pot and from the bottom to the opening side thereof, that is, in an axial direction of the cylindrical pot is applied to food to be cooked.

Further, a stirrer is provided in an inclined fashion such that the stirrer is moved down from the opening side toward the bottom of the pot, that is, in a manner of gradually moving close to an axis of the pot toward the bottom of the pot, whereby the axial rotational operation applied to the pot is further promoted to increase the mixing effect of food to be cooked.

Moreover, water is supplied and scattered on the moving heating surface to constitute a water screen on the beating surface. Thus, frying cooking without scorch can be made without using oil.

Furthermore, since water vapor confined in the pot is removed by vapor removing means provided on the body of the pot during heating and cooking, the water vapor can be removed without lowering the temperature of the pot body, thus preventing food to be cooked from becoming watery due to the excessive water vapor.

Other objects and advantages of the present invention will become clearer by the ensuing explanation of the embodiments in connection with the accompanying drawings.

DETAILED DESCRIPTION OF THE INVENTION

Figure 1:
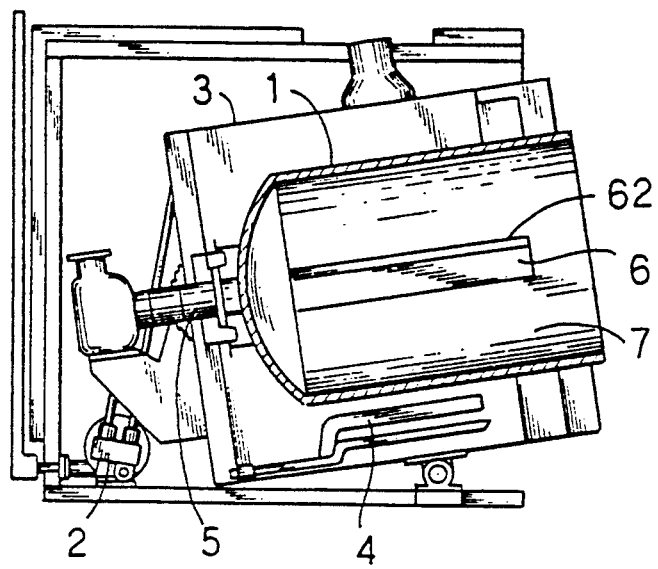
FIG. 1 is a longitudinal sectional view showing an embodiment of a stirring device for food according to the present invention.

The embodiments of the present invention will be described hereinbelow with reference to the drawings.

Reference numeral 1 denotes a cylindrical pot body provided with a stirrer 6 on an inner wall thereof. The body 1 is supported to be turned up on a heating burner 4 by a turn-up driving device 2 and a support frame 3 and is rotated by a rotational shaft 5. While in the present embodiment, a case of heating cooking is described so that the heating burner 4 and the like have complicated structures, it is of course noted that in an exclusive case of stirring cooking such as a vinegared rice or a dressed dish, the complicated devices such as the heating burner 4 are not necessary but a simpler structure, for example, a structure alone will suffice in which a cylindrical pot provided with a stirrer 6 with the aid of a manual rotating mechanism is obliquely supported.

An angle of inclination of the cylindrical pot will suffice to be an extent that the bottom thereof is slightly moved down from a horizontal state, and as the case may be, it may be horizontal. The stirrer 6 is projected in an axial direction of the cylindrical pot 1 and designed so that the width of a scrape-up surface becomes narrow from an opening side 11 of the pot toward a bottom 12, and a projection 62 is provided on the outer edge of the surface 61. The stirrer is of a triangular-shaped vertical cross-section.

Further, the stirring effect of the stirrer 6 can be enhanced by providing it in an inclined fashion so as to gradually come close to the axis of the cylindrical pot from the opening side 11 of the pot toward the bottom 12 thereof with respect to the axis Y of the inner wall of the cylindrical pot 1. It is noted of course that the stirrer 6 may be provied parallel with the axis Y of the inner wall of the cylindrical pot 1.

Reference numeral 63 denotes a splice line between a pedestal portion 64 and an upper portion of the stirrer. In fabrication of a stirrer, first, the pedestal portion is welded to the inner wall of the pot from both inside and outside of the pedestal plate, and then the upper portion is mounted and welded to the pedestal to thereby prevent peeling of weld or cracks caused by expansion or contraction of a material to be heated for occuring.

When material to be cooked A such as cut onions, ham, cooked rice, etc are charged into the thus configured cylindrical pot 1 and rotated, the material A is moved in a direction reverse to the rotating direction of the pot due to its own weight and scraped up. However, the width of the scrape-up surface 61 on the bottom 12 side of the pot is narrow and the surface 61 is moved down toward the bottom 12 by the inclined support of the cylindrical pot 1 and downward inclination of the stirrer 6. Therefore, the material A impinges upon the bottom 12 by the force of moving down toward the bottom 12 due to its own weight and the falling force toward the inner wall surface 7 resulting from upward movement beyond a support angle of the scrape-up surface 61 due to the rotation of the pot. Its reaction and rotational reaction force of the pot cause the material A to turn in the direction of the opening 11, and again, motion to be scraped up by the stirrer 6 is repeated for stirring and cooking.

When the scrape-up surface 61 is moved upward beyond the support angle by the rotation of the pot, since the projection 62 is provided on the outer edge, there is created a flow such that the material A is not immediately fallen onto the inner wall surface 7 but supported on the projection 62 and moved down toward the bottom 12 to impede movement of the material A in a lump.

When the cylindrical pot 1 is reversed after it has been rotated for a given time, the material A uniformly slides also on an unused heating surface K produced at the lower part of the stirrer 6, enabling heat efficiency to enhance. Particularly, in a case of a large-diameter cylindrical pot for volume cooking, a pluraity of stirrers are opposedly provided so that respective scrape-up surfaces and projections are made to act according to the rotational direction of the cylindrical pot to change the rotation for alternate operation. Then, both the stirring effect and cooking effect result in advantageous results.

Figure 2:
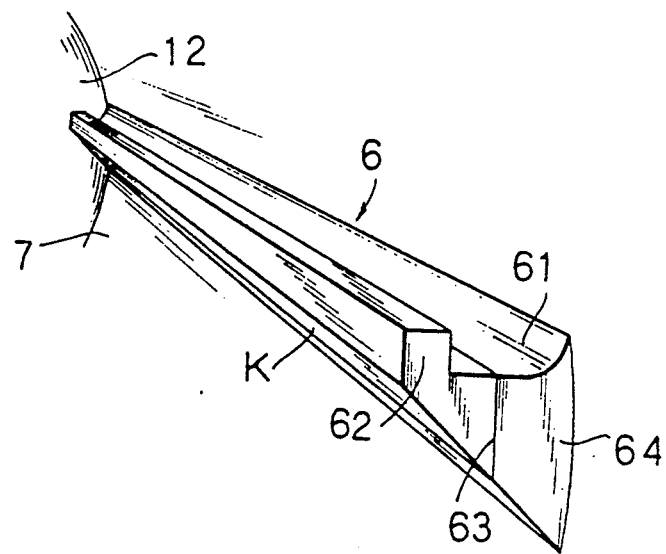
FIG. 2 is an enlarged perspective view showing a stirrer of the device in FIG. 1.
Figure 3:
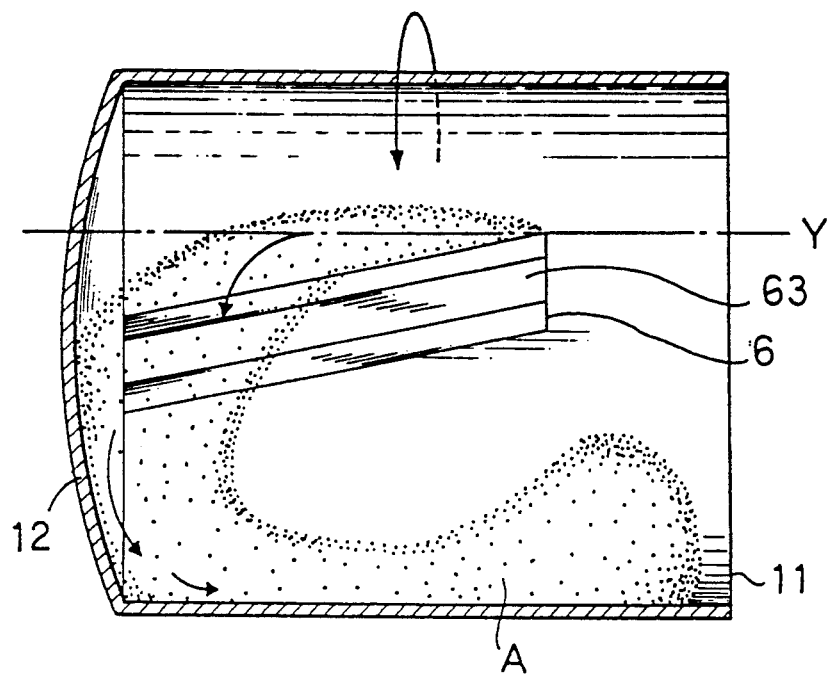
FIG. 3 is an enlarged longitudinal sectional view of a cylindrical pot showing a further example of a stirrer and the rotational operation of material to be cooked.
Figure 4:
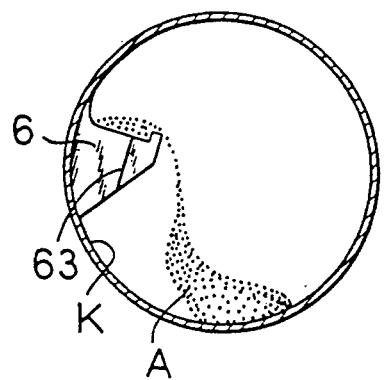
FIG. 4 is a cross sectional view of a cylindrical pot shown in Pig. 3.
Figure 5:
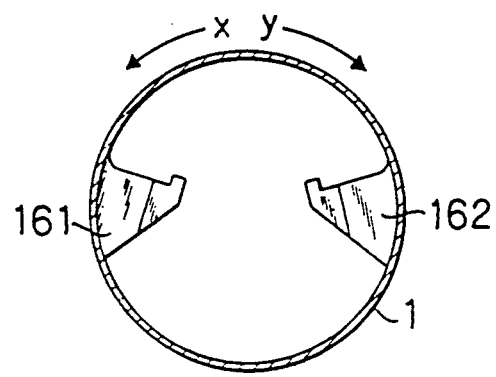
FIG. 5 is a cross sectional view showing another embodiment in which a plurality of stirrers are provided on a cylindrical pot.

FIG. 5 is a cross sectional view of a cylindrical pot showing a further embodiment. In FIG. 5, reference numerals 161 and 162 denote respective stirrer provided on the inner wall portion of the cylindrical pot body 1. The detailed structure of these stirrers 161 and 162 are similar to that of the stirrer 6 shown in FIG. 2. The material is very conveniently stirred and cooked by use of the thus structured cylindrical pot. That is, when the material is put into the cylindrical pot 1 and the cylindrical pot 1 is rotated in a direction of x, the material is scraped up in the direction of x by the stirrer 161, and when it is scraped up to some extent, the materials falls down due to its own weight. During this time, the material is stirred and mixed also in the axial direction of the cylindrical pot 1 since the construction of the stirrer 161 is such that as shown in FIG. 2, it is formed to be gradually narrow toward the bottom and the projection stood upright facing to the wall surface is provided on the outer edge portion of the stirrer. Next, when the cylindrical pot 1 is rotated in a direction of y opposite the direction x. the material is then scraped up in the direction of y by the other stirrer 162 and falls down, and the material is stirred and mixed also in the axial direction of the cylindrical pot 1. Accordingly, the material within the cylindrical pot 1 is uniformly stirred and heated.

Figure 6:
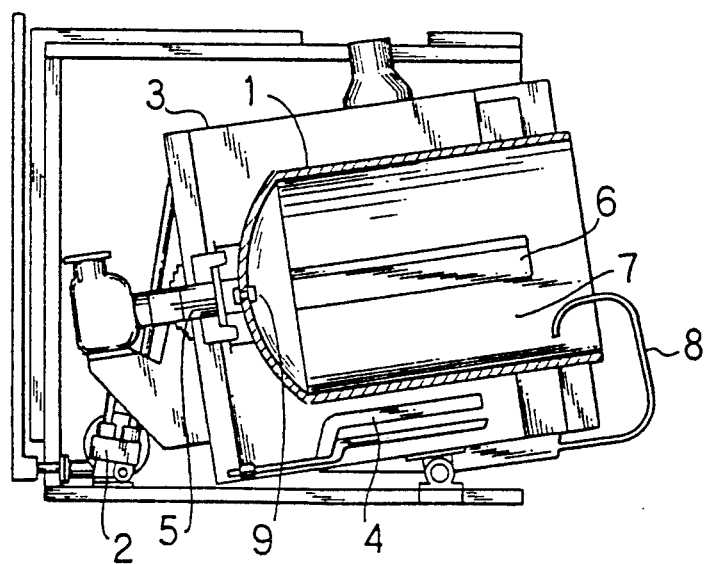
FIG. 6 is a longitudinal sectional view showing an apparatus used for a food cooking method according to the present invention.

FIG. 6 is a longitudinal sectional view showing an apparatus used for the food cooking method according to the present invention. In FIG. 6, parts which are the same as or corresponding to those of FIG. 1 are indicated by the same reference numerals. Reference numeral 8 denotes a water supply nozzle. Water from the nozzle 8 is blown, immediately before the material falls down, against the heating surface 7 on which the material scraped up by the stirrer 6 is not present, to form a vapor film between the material which is boiled and diffused and fallen and the cooking surface. With this, the material slides along the heating surface without being scorched and is again scraped by the stirrer and separated and from the heating surface and fallen. Such cooking operation is continued.

Reference numeral 9 denotes a blower electrically connected to a driving source not shown. When a temperature within the pot body exceeds a predetermined temperature, the blower is driven to feed air and discharge water vapor generated in the pot body 4.

The stirring apparatus for food and cooking method according to the present invention are constructed as described above. Not only the material to be cooked rotates along the edge of the cylindrical pot but also the longitudinal rotational operation from the opening side to the bottom of the pot, and from the bottom to the opening side of the pot is applied to the material to be cooked as well as the roation along the edge whereby turning and stirring are carried out. Therefore, there are advantageous effects in that by adjusting the angle of inclination and rotational speed of the cylindrical pot, not only granular food but also delicate food such a dressed dish, a salad and the like can be also stirred and cooked.

Furthermore, according to the present invention, it is possible to perform frying cooking without use of oil and without making a scorch, and it is possible to remove water vapor generated during heating and cooking without lowering a temperature of the pot body.

In the claims:

1. a food stirring apparatus comprising:
   a rotatably mounted cylindrical body having an arched bottom, an inner wall and an opening opposite of the arched bottom; and
   a stirring member mounted to the inner wall in an axial direction, the stirring member having an outer edge defining a scrape-up surface, the stirring member having an outer edge defining a scrape-up surface, the stirring member having a substantially triangular-shaped vertical cross-section, the stirring member also having a width which gradually narrows from the opening to the bottom of the body.

2. The food stirring apparatus according to claim 1, wherein the stirring member is mounted to the inner wall on an angle with respect to the axis of the body.

3. The food stirring apparatus according to claim 1, including heating means for heating the body and a second stirring member mounted to the inner wall opposite of the first stirring member.

4. The food stirring apparatus according to claim 1, including vapor removal means at a central portion of the arched bottom of the body.

5. The food stirring apparatus according to claim 1, including inclined support means for inclining the body.

6. The food stirring apparatus according to claim 1, wherein the stirring member comprises a mounting portion mounted to the inner wall, the mounting portion having an upper portion and a projection mounted to the upper portion of the mounting portion.

7. The food stirring apparatus according to claim 6, wherein the scrape-up surface faces a direction opposite of a direction of rotation for the body.

* * * * *